(12) United States Patent
Miller, II

(10) Patent No.: US 11,969,040 B2
(45) Date of Patent: Apr. 30, 2024

(54) SYSTEM FOR EMBROIDERING A FLAME-RESISTANT EMBLEM

(71) Applicant: Thomas Kemp Miller, II, Dunkirk, MD (US)

(72) Inventor: Thomas Kemp Miller, II, Dunkirk, MD (US)

( * ) Notice: Subject to any disclaimer, the term of this patent is extended or adjusted under 35 U.S.C. 154(b) by 90 days.

(21) Appl. No.: 17/582,972

(22) Filed: Jan. 24, 2022

(65) Prior Publication Data
US 2022/0322773 A1    Oct. 13, 2022

Related U.S. Application Data

(60) Provisional application No. 63/172,571, filed on Apr. 8, 2021.

(51) Int. Cl.
*A41D 31/08*    (2019.01)
*A41D 27/08*    (2006.01)
(Continued)

(52) U.S. Cl.
CPC .............. *A41D 31/08* (2019.02); *A41D 27/08* (2013.01); *B32B 5/073* (2021.05); *B32B 5/26* (2013.01);
(Continued)

(58) Field of Classification Search
CPC .... A41D 31/08; A41D 27/08; A41D 2500/20; B32B 5/073; B32B 5/26; B32B 2262/0269; B32B 2307/3065
See application file for complete search history.

(56) References Cited

U.S. PATENT DOCUMENTS 9,338 A  *  10/1852  Avery .................... D05B 57/02
                                                      112/315
6,624,096 B2    9/2003  Thomas
(Continued)

FOREIGN PATENT DOCUMENTS

WO    WO2004015180 A2    2/2004

OTHER PUBLICATIONS

Emblemtek "Flame Resistant Embroidered Emblems" (rev 2016) retrieved from: https://emblemtek.com/wp-content/uploads/2016/11/Flame-Resistant-Embroidered-Emblems-Product-Sheet-rev-2016-04a.pdf on Jun. 15, 23 (Year: 2016).*

*Primary Examiner* — Alicia J Weydemeyer
*Assistant Examiner* — Laura B Figg

(57) ABSTRACT

A system for embroidering a flame-resistant emblem uses flame-resistant threads for both the primary thread and the bobbin thread, as well as any accompanying supplemental fabrics. The flame-resistant primary thread protects the embroidered portion of the underlying material from any direct flame exposure. The flame-resistant bobbin thread ensures that the embroidered pattern cannot fall off of a garment, further flameproofing both the garment and present invention. Furthermore, a backing may be provided as a mechanism for providing a stitchwork surface and for adding dimensionality to the pattern. The backing may also be made of fireproof threads. The apparatus may also be utilized for appending a flame-resistant patch or patches onto a garment. Such a mechanism allows for attachment of flame-resistant threadwork onto any clothing. The primary thread, bobbin thread, backing, and any other additional threads may utilize fire-resistant aramid fibers, which sufficiently fireproofs garments before deployment into potential fire exposure.

14 Claims, 4 Drawing Sheets

(51) Int. Cl.
   *B32B 5/06*      (2006.01)
   *B32B 5/26*      (2006.01)
(52) U.S. Cl.
   CPC .. *A41D 2500/20* (2013.01); *B32B 2262/0269* (2013.01); *B32B 2307/3065* (2013.01)

(56) References Cited

U.S. PATENT DOCUMENTS

| | | |
|---|---|---|
| 7,168,140 B2 | 1/2007 | McKee |
| 9,994,978 B2 | 6/2018 | Truesdale |
| 2006/0021113 A1 | 2/2006 | Wenkman |
| 2013/0212788 A1* | 8/2013 | Curtis ................ A41D 13/0012 2/455 |
| 2016/0059050 A1* | 3/2016 | Gomez ................ A62B 17/003 2/458 |

* cited by examiner

SYSTEM FOR EMBROIDERING A FLAME-RESISTANT EMBLEM

The current application claims a priority to the U.S. Provisional patent application Ser. No. 63/172,571 filed on Apr. 8, 2021.

FIELD OF THE INVENTION

The present invention relates generally to apparel threadwork. More specifically, the system for embroidering a flame-resistant emblem relates to a mechanism for embroidering or otherwise connecting symbols, patterns, and more onto clothing such that the created design is resistant to damage due to exposure to fire.

BACKGROUND OF THE INVENTION

Patterns and designs upon clothing may serve a variety of purposes. While many patches and embroidered items are often implemented for purely ornamental or decorative purposes, a variety of stitchwork, hemming, and other patternmaking also often serves functional purpose beyond decoration. Patches, embroidery, and similar clothing may be used to indicate different groups or teams, to show support for a cause, or simply as a practical means of covering a hole in a torn item.

However, many items of clothing are designed for conditions that are unsuitable for common threadwork. Firefighters, electricians, welders, and more often both train and practice in close proximity to fire. While their respective uniforms and garments are generally considered safe with respect to protecting the wearer from high heat environments and exposure to fires, electrical arcing, and more, the patchwork upon these garments often lacks the desirable properties necessary to resist damage due to exposure to these elements. A standard embroidery upon a firefighter's uniform may not only burn off in the line of duty, but may be an active fire hazard, potentially causing injury. What is needed is a mechanism to provide embroidery that is resistant to damage or catching fire when exposed to flames.

The present invention addresses this issue. The system for embroidering a flame-resistant emblem uses flame-resistant threads for both the primary thread and the bobbin thread, as well as any accompanying supplemental fabrics. The flame-resistant primary thread protects the embroidered portion of the underlying material from direct flame exposure. The flame-resistant bobbin thread ensures that the embroidered pattern cannot fall off of a garment, further flameproofing both the garment and present invention. Furthermore, a backing may be provided as a mechanism for providing a stitchwork surface and for adding dimensionality to the pattern. The backing may also be made of fireproof threads. The present invention may also be utilized for appending a flame-resistant patch or patches onto a garment. Such a mechanism allows for attachment of flame-resistant threadwork onto any clothing.

DETAILED DESCRIPTION OF THE INVENTION

All illustrations of the drawings are for the purpose of describing selected versions of the present invention and are not intended to limit the scope of the present invention.

Figure 1:
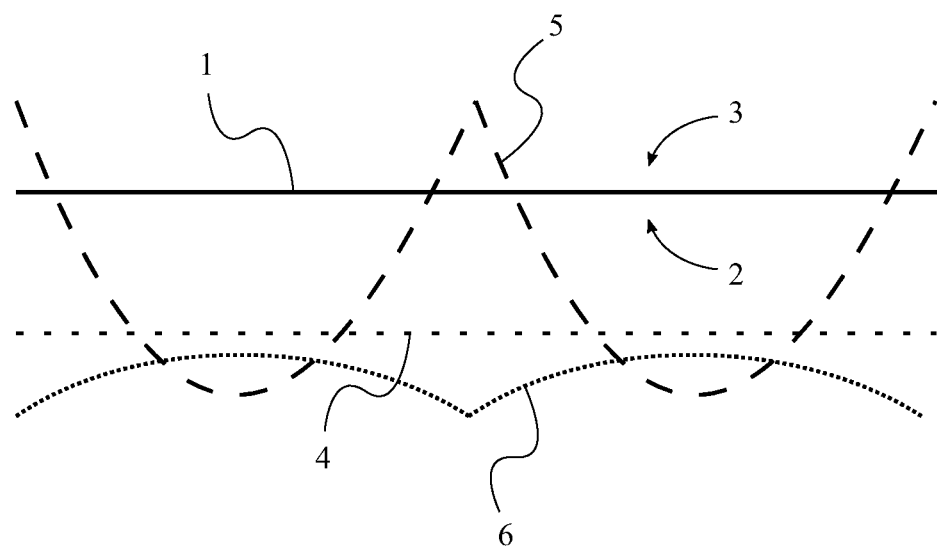
FIG. 1 is a schematic diagram of a stitch pattern of the present invention.

The present invention is a system for embroidering a flame-resistant emblem that is used to create flame-resistant patterns, logos, badges, symbols, and more. The present invention is also configured to append such emblems onto existing apparel, especially flame-resistant apparel. The present invention comprises a piece of garment fabric 1, a flame-resistant backing 4, a first flame-resistant thread 5, and a second flame-resistant thread 6, as represented in FIG. 1. The piece of garment fabric 1 is any apparel or segment of apparel that is to be adorned with an embroidered emblem, including jackets, coats, uniforms, pants, shirts, hats, and more. The flame-resistant backing 4 is a segment of generally fabric material utilized for structural support as an intermediate fabric between the first flame-resistant thread 5 and the second flame-resistant thread 6 that embellishes the produced visuals upon the piece of garment fabric 1. The first flame-resistant thread 5 is a strand of flame-resistant material which may be sewn, hemmed, stitched, or otherwise integrated into the piece of garment fabric 1 and the flame-resistant backing 4. Similarly, the second flame-resistant thread 6 is a strand of flame-resistant material, often referred to in the industry as a bobbin thread, which may be sewn, hemmed, stitched, or otherwise integrated into the piece of garment fabric 1 and the flame-resistant backing 4 in order to further secure the first flame-resistant thread 5 in a desirable position. The first flame-resistant thread 5 and the second flame-resistant thread 6 may be made of a variety of flame-resistant materials capable of being woven or stitched together. Additionally, the first flame-resistant thread 5 and the second flame-resistant thread 6 may encompass several threads tied end-to-end or composites of different colors of materials which, in the preferred usage of the present invention, form the visible exterior of the present invention. Furthermore, the piece of garment fabric 1 may comprise an inner fabric surface 2 and an outer fabric surface 3. The inner fabric surface 2 is the portion of the piece of garment fabric 1 that generally contacts the surface of the flame-resistant backing 4. The outer fabric surface 3 is the portion of the piece of garment fabric 1 that generally faces away from the flame-resistant backing 4, toward a user's body, in the preferred usage of the present invention.

The general configuration of the aforementioned components allows the present invention to efficiently and effectively embroider a flame-resistant emblem onto a garment. The flame-resistant backing 4 may be positioned against the inner fabric surface 2, as represented in FIG. 1. This arrangement ensures that the flame-resistant backing 4 may be placed in the appropriate position and orientation upon the piece of garment fabric 1 to allow for secure attachment of the first flame-resistant thread 5 and the second flame-resistant thread 6. The first flame-resistant thread 5 may be stitched through the piece of garment fabric 1 and the flame-resistant backing 4. Thus, the flame-resistant backing 4 may be locked into place against the piece of garment fabric 1 by the first flame-resistant thread 5. The second flame-resistant thread 6 may be stitched through the first flame-resistant thread 5, the flame-resistant backing 4, and the piece of garment fabric 1. This arrangement allows the second flame-resistant thread 6 to secure the first flame-resistant thread 5 in place atop the flame-resistant backing 4 and the piece of garment fabric 1.

The first flame-resistant thread 5 and the second flame-resistant thread 6 are insufficient to prevent the entirety of the piece of garment fabric 1 from igniting. To prevent this from occurring, the piece of garment fabric 1 may be made of a flame-resistant fabric. In this way, none of the piece of garment fabric 1, the flame-resistant backing 4, the first flame-resistant thread 5, or the second flame-resistant thread 6 present an issue as fire hazards while in use adjacent to flames or flammable material.

Among the materials which have been found to be particularly effective at resisting damage due to exposure to flames, aramid fibers possess particularly desirable properties for threading and stitchwork. Therefore, the flame-resistant backing 4 may be made of aramid fibers. This arrangement ensures that the flame-resistant backing 4 possesses desirable mechanical properties in addition to being fundamentally flame-resistant.

Aramid fibers are capable of being dyed or otherwise colored, making such fibers desirable for use in creating emblems and other patterns. Thus, the first flame-resistant thread 5 may be made of aramid fibers. In this way, the first flame-resistant thread 5 possesses the desirable mechanical, flame-resistant, and aesthetic properties necessary for application in embroidery.

Furthermore, the second flame-resistant thread 6 must be made of a material capable of securing the first flame-resistant thread 5 in place during exposure to flames. Therefore, the second flame-resistant thread 6 may be made of aramid fibers. In this way, the second flame-resistant thread 6 may be utilized to lock the first flame-resistant thread 5 in place during use.

Figure 2:
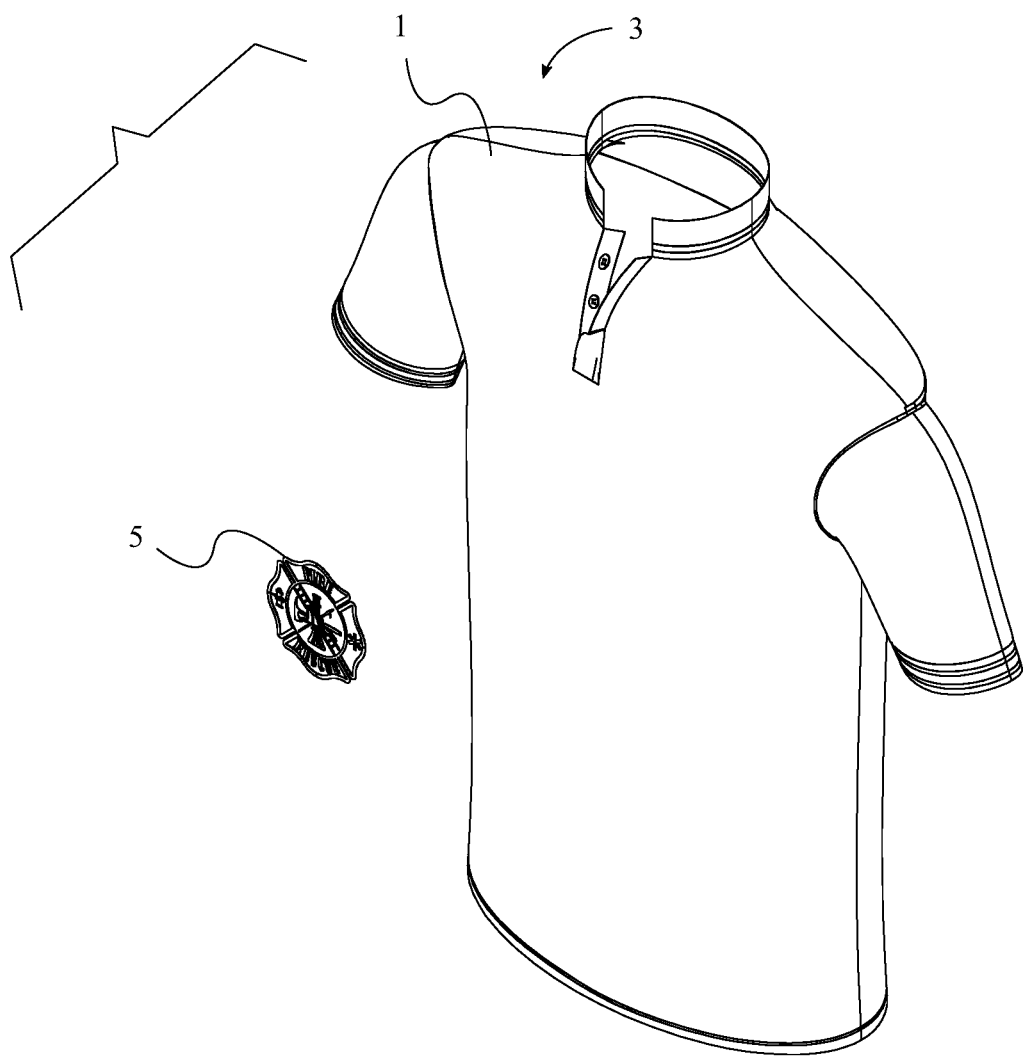
FIG. 2 is a front perspective view of the present invention.
Figure 3:
FIG. 3 is a front view of the present invention.

A user may wish to develop and implement a classical embroidery using the first flame-resistant thread 5. To this end, the first flame-resistant thread 5 may be arranged into an emblem-displaying configuration across the outer fabric surface 3, as represented in FIGS. 2 and 3. In this way, the desired embroidered pattern may be outwardly displayed upon the piece of garment fabric 1.

Figure 4:
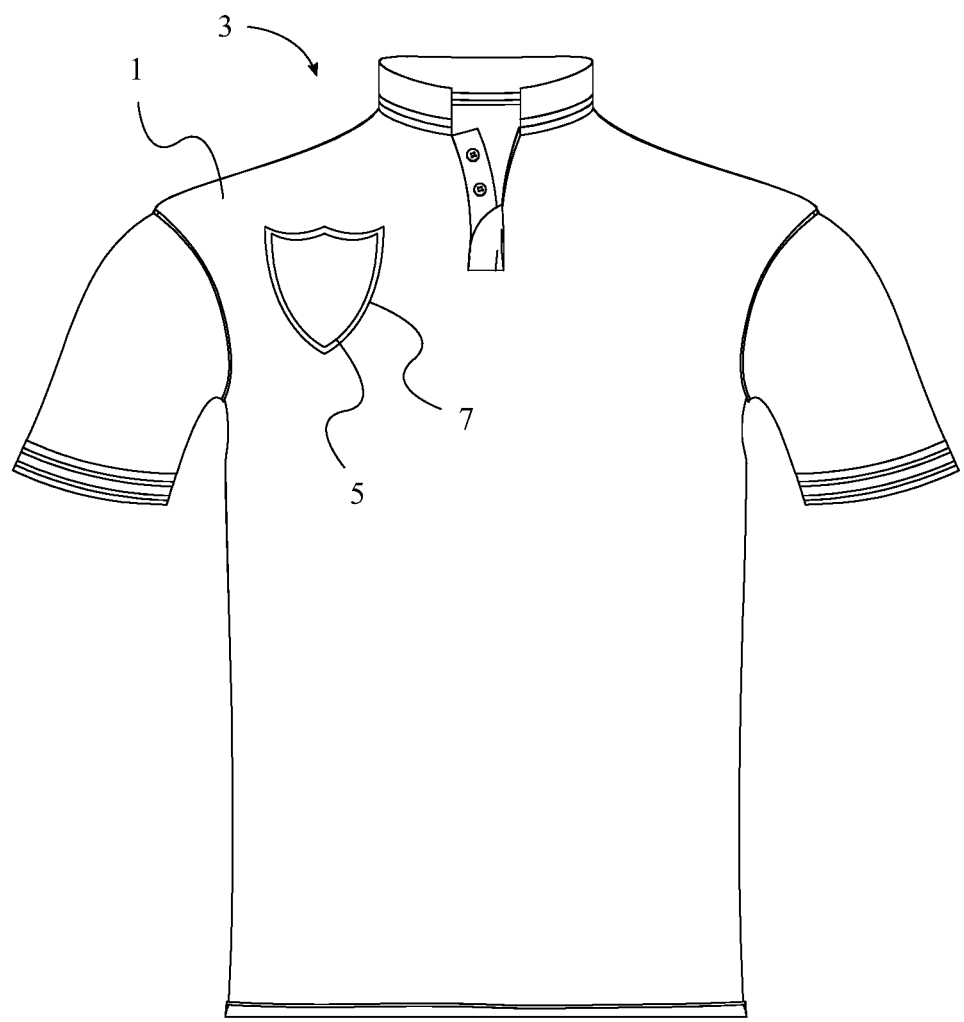
FIG. 4 is a rear-right perspective view of the present invention utilizing a patch.

It may be desirable to append pre-made fabric items onto the piece of garment fabric 1. To allow for this, in an exemplary embodiment, the present invention may further comprise a fabric patch 7, as represented in FIG. 4. The fabric patch 7 is a generally flexible segment of sewn threads, stitched threads, or otherwise flexible, preferably flame-proof material which may be appended onto a piece of clothing for practical or ornamental purposes. The fabric patch 7 may be positioned against the outer fabric surface 3. This arrangement, preferably opposite the flame-resistant backing 4, allows for the fabric patch 7 to be visible when connected to the piece of garment fabric 1. The first flame-resistant thread 5 may be stitched through the fabric patch 7, the piece of garment fabric 1, and the flame-resistant backing 4. Thus, the first flame-resistant thread 5 may be utilized to join the fabric patch 7 onto the piece of garment fabric 1. In an exemplary embodiment, the first flame-resistant thread 5 may be positioned peripherally around the fabric patch 7. This arrangement allows for secure connection of the fabric patch 7 onto the piece of garment fabric 1 without visually obstructing the fabric patch 7.

The user also benefits from addressing the potential fire hazard of a flammable embodiment of the fabric patch 7. To this end, the fabric patch 7 may be made of a flame-resistant fabric. In this way, the fabric patch 7 does not increase the flammability of the present invention, thus enhancing user safety.

Although the invention has been explained in relation to its preferred embodiment, it is to be understood that many other possible modifications and variations can be made without departing from the spirit and scope of the invention as hereinafter claimed.

What is claimed is:

1. A system for embroidering a flame-resistant emblem comprising:
    a piece of garment fabric;
    a flame-resistant backing;
    a first flame-resistant thread;
    a second flame-resistant thread;
    the piece of garment fabric comprising an inner fabric surface and an outer fabric surface;
    the flame-resistant backing being positioned against the inner fabric surface;
    the flame-resistant backing being in physical contact with the inner fabric surface;
    the first flame-resistant thread being stitched through the piece of garment fabric and the flame-resistant backing;
    the first flame-resistant thread being arranged into an embroidery-displaying configuration across the outer fabric surface;
    a periphery of the flame-resistant backing being coextensive with a periphery of the embroidery-displaying configuration; and
    the second flame-resistant thread being stitched through the first flame-resistant thread, the flame-resistant backing, and the piece of garment fabric.

2. The flame-resistant embroidery as claimed in claim 1, wherein the piece of garment fabric is made of a flame-resistant fabric.

3. The flame-resistant embroidery as claimed in claim 1, wherein the flame-resistant backing is made of aramid fibers.

4. The flame-resistant embroidery as claimed in claim 1, wherein the first flame-resistant thread is made of aramid fibers.

5. The flame-resistant embroidery as claimed in claim 1, wherein the second flame-resistant thread is made of aramid fibers.

6. The flame-resistant embroidery as claimed in claim 1 comprising:
    a fabric patch;
    the fabric patch being a flat fabric emblem;
    the fabric patch being positioned flat against the outer fabric surface; and
    the first flame-resistant thread being stitched through a periphery of the fabric patch in a closed loop.

7. The flame-resistant embroidery as claimed in claim 6, wherein the fabric patch is made of a flame-resistant fabric.

8. A system for embroidering a flame-resistant emblem comprising:
    a piece of garment fabric;
    a flame-resistant backing;
    a first flame-resistant thread;
    a second flame-resistant thread;
    a fabric patch;
    the piece of garment fabric comprising an inner fabric surface and an outer fabric surface;
    the flame-resistant backing being positioned against the inner fabric surface;
    the flame-resistant backing being in physical contact with the inner fabric surface;
    the first flame-resistant thread being stitched through the piece of garment fabric and the flame-resistant backing;
    the first flame-resistant thread being arranged into an embroidery-displaying configuration across the outer fabric surface;

a periphery of the flame-resistant backing being coextensive with a periphery of the embroidery-displaying configuration;

the second flame-resistant thread being stitched through the first flame-resistant thread, the flame-resistant backing, and the piece of garment fabric;

the fabric patch being a flat fabric emblem;

the fabric patch being positioned flat against the outer fabric surface; and the first flame-resistant thread being further stitched through a periphery of the fabric patch in a closed loop.

9. The flame-resistant embroidery as claimed in claim 8, wherein the piece of garment fabric is made of a flame-resistant fabric.

10. The flame-resistant embroidery as claimed in claim 8, wherein the flame-resistant backing is made of aramid fibers.

11. The flame-resistant embroidery as claimed in claim 8, wherein the first flame-resistant thread is made of aramid fibers.

12. The flame-resistant embroidery as claimed in claim 8, wherein the second flame-resistant thread is made of aramid fibers.

13. The flame-resistant embroidery as claimed in claim 8, wherein the fabric patch is made of a flame-resistant fabric.

14. A system for embroidering a flame-resistant emblem comprising:

a piece of garment fabric;

a flame-resistant backing;

a first flame-resistant thread;

a second flame-resistant thread;

a fabric patch;

the piece of garment fabric comprising an inner fabric surface and an outer fabric surface;

the flame-resistant backing being positioned against the inner fabric surface;

the flame-resistant backing being in physical contact with the inner fabric surface;

the first flame-resistant thread being stitched through the piece of garment fabric and the flame-resistant backing;

the first flame-resistant thread being arranged into an embroidery-displaying configuration across the outer fabric surface;

a periphery of the flame-resistant backing being coextensive with a periphery of the embroidery-displaying configuration;

the second flame-resistant thread being stitched through the first flame-resistant thread, the flame-resistant backing, and the piece of garment fabric;

the fabric patch being a flat fabric emblem;

the fabric patch being positioned flat against the outer fabric surface;

the first flame-resistant thread being further stitched through a periphery of the fabric patch in a closed loop;

the piece of garment fabric and the fabric patch being made of a flame-resistant fabric; and the flame-resistant backing, the first flame-resistant thread, and the second flame-resistant thread being made of aramid fibers.

\* \* \* \* \*